(12) United States Patent
Mueller

(10) Patent No.: US 9,045,086 B2
(45) Date of Patent: Jun. 2, 2015

(54) EXTERIOR MIRROR FOR A MOTOR VEHICLE

(71) Applicant: Dr. Ing. h.c.F. Porsche Aktiengesellschaft, Stuttgart (DE)

(72) Inventor: Marcus Mueller, Pforzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 237 days.

(21) Appl. No.: 13/848,951

(22) Filed: Mar. 22, 2013

(65) Prior Publication Data

US 2013/0250445 A1    Sep. 26, 2013

(30) Foreign Application Priority Data

Mar. 22, 2012   (DE) .................... 10 2012 102 440

(51) Int. Cl.
  *G02B 5/08*  (2006.01)
  *G02B 7/182* (2006.01)
  *B60R 1/00*  (2006.01)
  *B60R 1/06*  (2006.01)

(52) U.S. Cl.
  CPC .. *B60R 1/006* (2013.01); *B60R 1/06* (2013.01)

(58) Field of Classification Search
  None
  See application file for complete search history.

(56) References Cited

U.S. PATENT DOCUMENTS

2008/0088957 A1*  4/2008  Courbon et al. .............. 359/841

FOREIGN PATENT DOCUMENTS

DE     1 266 653     4/1968
DE     72 30 111    11/1972

* cited by examiner

*Primary Examiner* — Jade R Chwasz
(74) *Attorney, Agent, or Firm* — Gerald E. Hespos; Michael J. Porco; Matthew T. Hespos

(57) ABSTRACT

An exterior mirror has a mirror foot lower part mounted in a cavity in a vehicle door. A mirror foot upper part is mounted on the mirror foot lower part via a six-point mounting so that the mirror foot upper part protrudes from the door. A mirror head is mounted on the mirror foot upper part. The two mirror foot parts are held pressed together via a leaf spring and a separating plane between the two mirror foot parts of the exterior mirror is in the door cavity. In the event of a pendulum impact, the mirror foot upper part together with the mirror head is separated from the door-mounted mirror foot lower part and remains in the cavity of the door.

11 Claims, 6 Drawing Sheets

EXTERIOR MIRROR FOR A MOTOR VEHICLE

CROSS REFERENCE TO RELATED APPLICATIONS

This application claims priority under 35 USC 119 to German Patent Appl. No. 10 2012 102 440.5 filed on Mar. 22, 2012, the entire disclosure of which is incorporated herein by reference.

BACKGROUND OF THE INVENTION

1. Field of the Invention

The invention relates to an exterior mirror for a motor vehicle that has a mirror foot lower part fastened to a vehicle door and to which a mirror foot upper part is releasably fastened by a mirror head.

2. Description of the Related Art

DE 1 266 653 discloses an exterior mirror for a motor vehicle. The exterior mirror has a foot connected fixedly to the bodywork of the vehicle and also to a mirror housing. The mirror housing is displaceable in the longitudinal direction of the vehicle counter to the resistance of a spring and is laterally rotatable and tiltable from any displaced position. Furthermore, DE 72 30 111 discloses an exterior mirror for a vehicle. The exterior mirror rebounds under the effect of an impact and has a head held on bolts of a mirror foot.

It is an object of the invention to provide an exterior mirror for a motor vehicle that is detached from the vehicle in the event of a pendulum impact.

SUMMARY OF THE INVENTION

The invention relates to an exterior mirror for a motor vehicle with a mirror foot that has upper and lower parts connected to one another so that the upper part can be separated from the lower part in the event of a pendulum impact or a collision with a person. The mirror foot upper and lower parts are held together via a multi-point mounting and are pressed together by a leaf spring fastened to the mirror foot upper part. In a connecting position, the mirror foot upper part engages over a wall section of the mirror foot lower part. A separating plane for the mirror foot parts is formed by the mountings between the mirror foot upper and lower parts and is arranged within the door.

The multi-point mounting preferably includes local mateable bearing points on the mirror foot upper and lower parts, such as wedge-shaped depressions on the mirror foot upper part that engage with wedge-shaped projections on the mirror foot lower part. Thus, the mirror foot parts can be separated from each other in a simple manner.

The bearing points of the bearings with the wedge-shaped depressions preferably are arranged in a triangular manner on a bearing plate of the mirror foot upper part and the wedge-shaped projections preferably are arranged in a triangular manner on a holding plate of the mirror foot lower part.

Two upper bearing points are arranged on each of the mirror foot upper part and the mirror foot lower part. The upper bearing points are spaced from one another in a common plane and are positioned in an obliquely running manner. The further bearing point is below the upper bearing points and is oriented to be upright in a vertical plane.

The arrangement of the bearing points and the clamping of the mirror parts with respect to each other via the leaf spring results in the longitudinally running connecting plane that defines a "separating plane" along which the mirror foot parts are separated from each other. Thus, the mirror foot upper part is pulled off upward from the mirror foot lower part, and the mirror foot lower part remains in the door.

The bearing points of the mirror foot lower part on the holding plate preferably are bordered laterally in each case by offset limbs of the holding plate and, in the connecting position with the mirror foot upper part on the bearing plate of the mirror foot upper part, for the limbs to hold the latter in a laterally supported manner. By this means, in addition to the leaf spring, the mirror foot upper part is supported laterally on the mirror foot lower part to create a stable connection.

The leaf spring on the mirror foot upper part preferably is arranged between the two upper bearing points and is connected to the bearing plate via screw bolts and extend with a free leaf spring end in the direction of the lower bearing point for engaging with the free end over the prepared wall section of the holding plate of the mirror foot lower part in a clamping manner.

The ends of the prepared wall section preferably have a pocket-shaped receptacle in which the free end of the leaf spring is inserted and held. The engaged-over wall section of the holding plate preferably lies in the center of the three bearing points. This arrangement and action of the leaf spring of the mirror foot upper part creates a fixed, but releasable, connection between the mirror foot upper part and the mirror foot lower part. The position of the leaf spring between the bearing points, the leaf spring creates targeted pressing between the mirror parts. Therefore the bearing points are pressed optimally against each other and define a fixed connection between the wedge-shaped depressions and the wedge-shaped projections of the bearing points.

An exemplary embodiment of the invention is illustrated in the drawings and is described in more detail below.

DETAILED DESCRIPTION OF THE PREFERRED EMBODIMENTS

Figure 1:
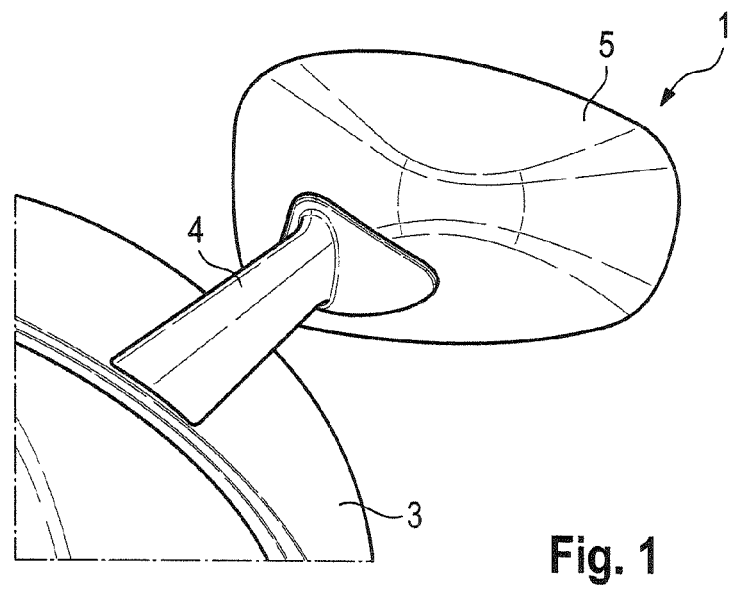
FIG. 1 shows an exterior mirror, seen from behind, with a mirror head and a mirror foot upper part.
Figure 2:
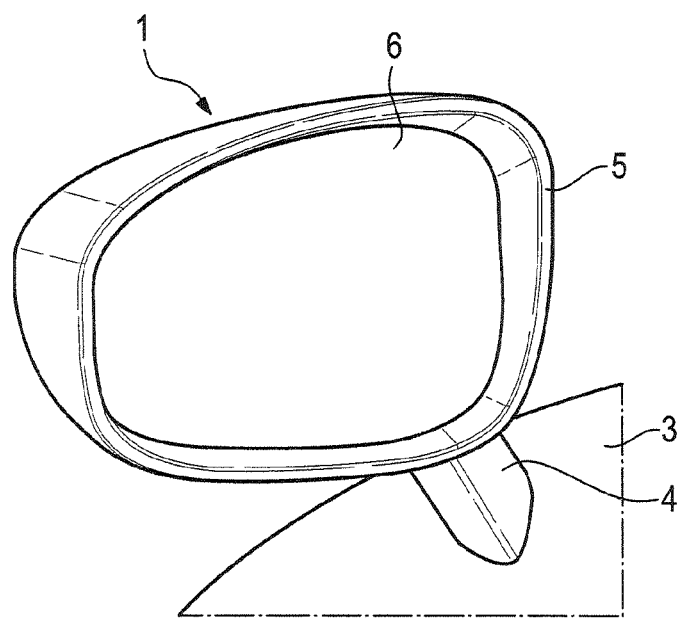
FIG. 2 shows an exterior mirror, as seen from the front.
Figure 3:
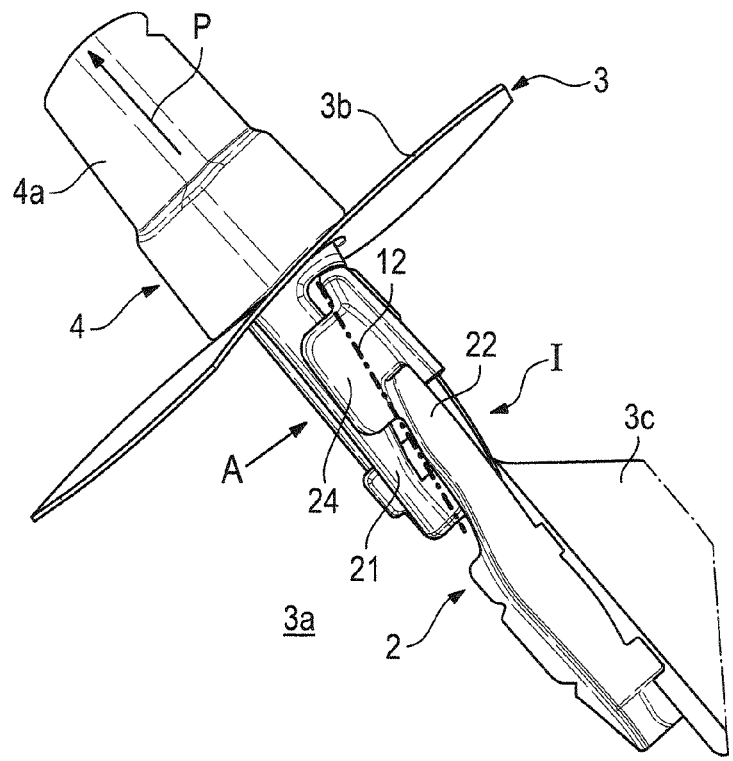
FIG. 3 shows a view of the mirror foot upper part with the releasably connectable mirror foot lower part.
Figure 4:
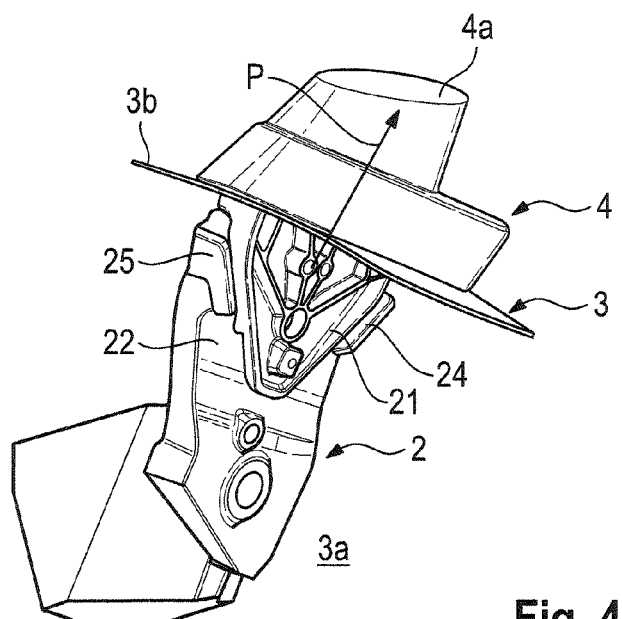
FIG. 4 shows a view according to arrow A of the mirror foot parts.
Figure 5:
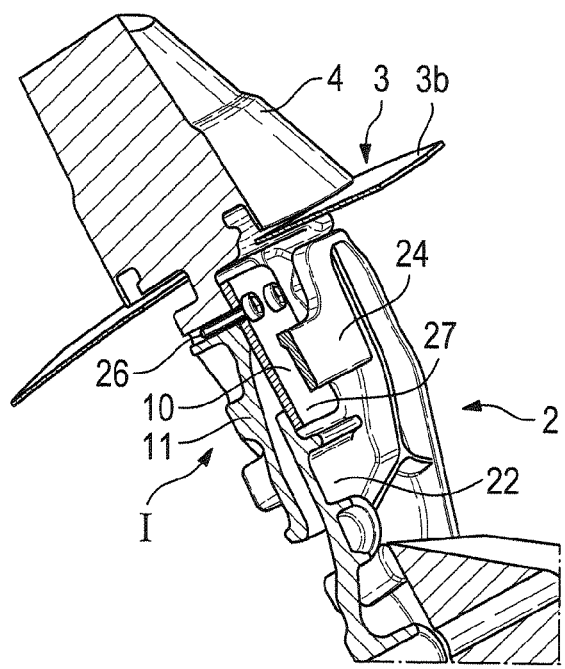
FIG. 5 shows a view of the mirror foot parts which are connected via a leaf spring.
Figure 6:
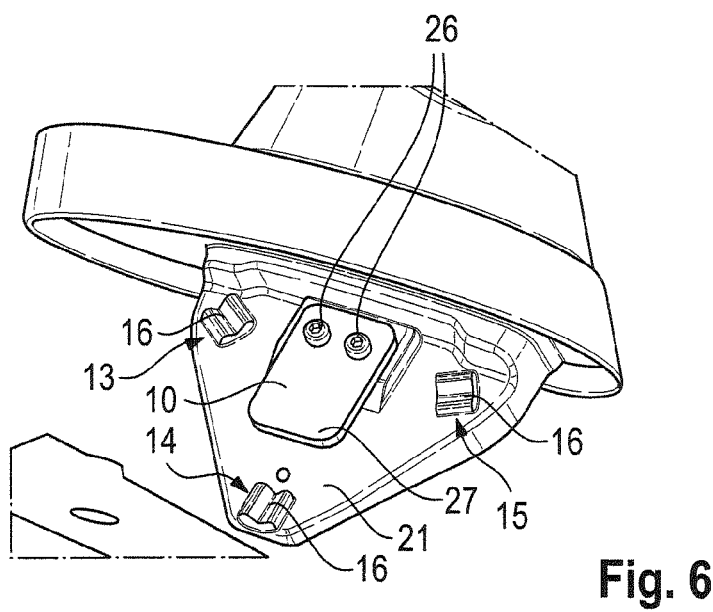
FIG. 6 shows a view of the mirror foot upper part with three bearing points and the leaf spring.
Figure 7:
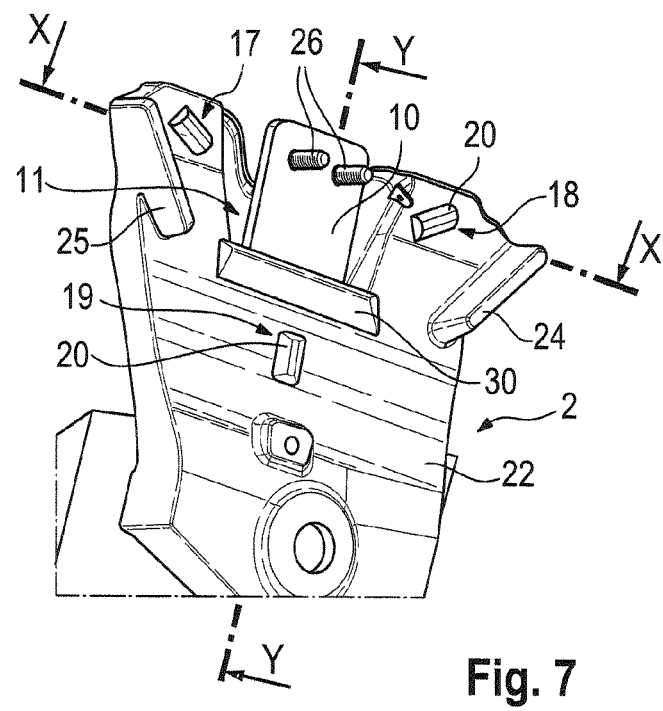
FIG. 7 shows a view of the mirror foot upper part with the three bearing points and the inserted leaf spring.
Figure 8:
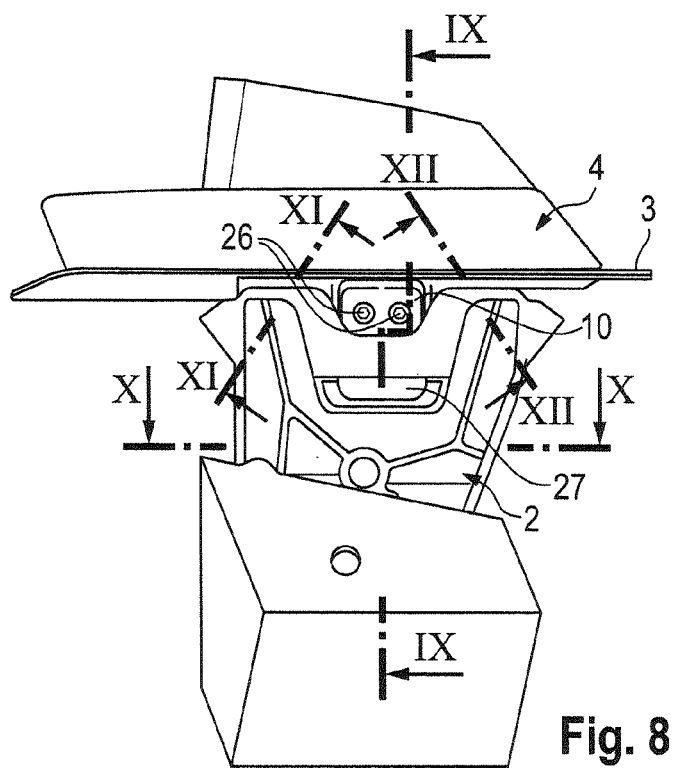
FIG. 8 shows a view of the mirror head lower part which is connected to the mirror head upper part.
Figure 9:
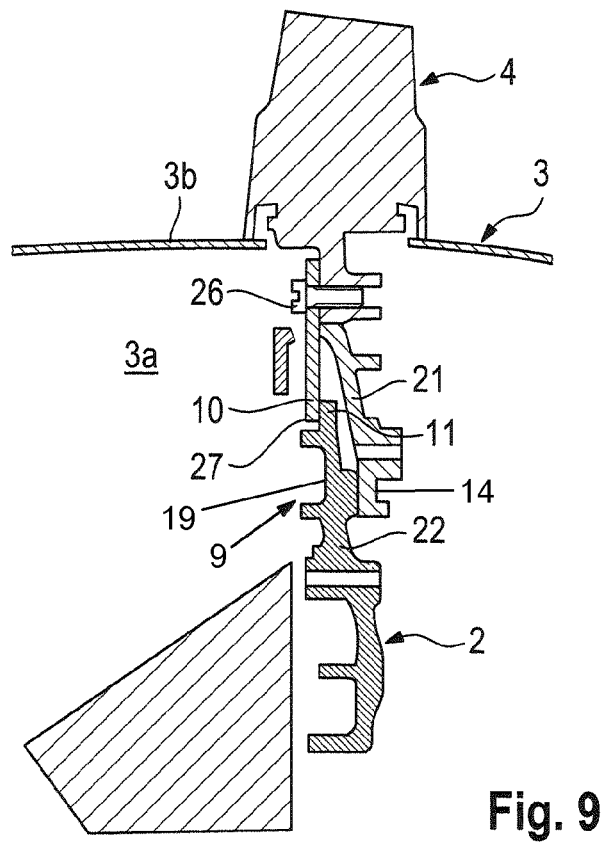
FIG. 9 shows a section according to the line IX-IX of FIG. 8.
Figure 10:
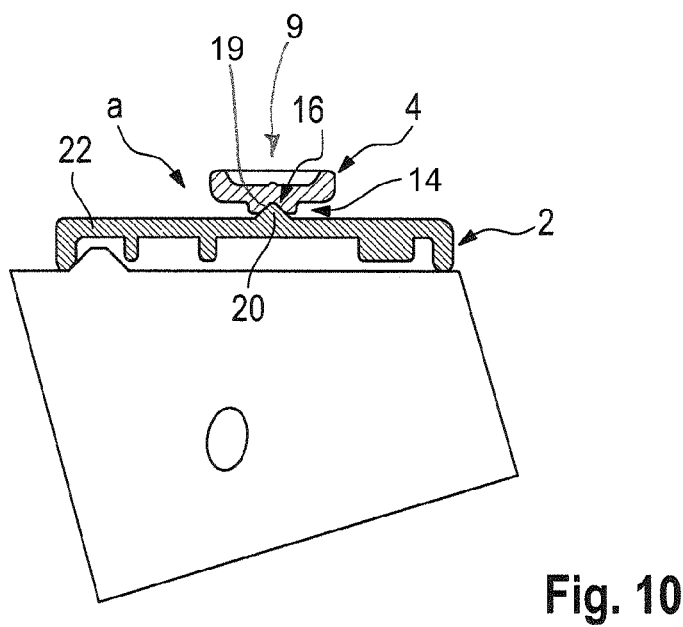
FIG. 10 shows a section according to the line X-X of FIG. 8.
Figure 11:
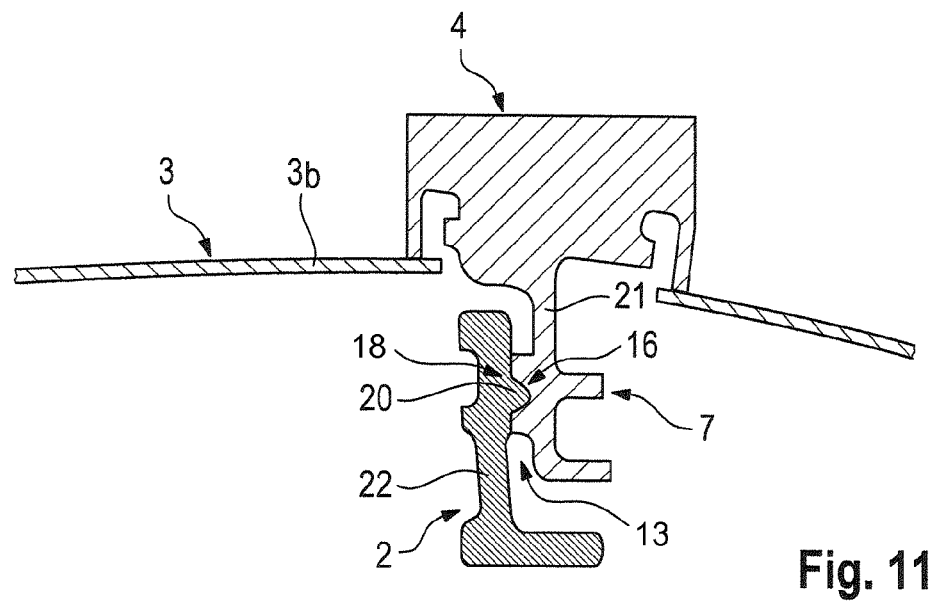
FIG. 11 shows a section according to the line XI-XI of FIG. 8.
Figure 12:
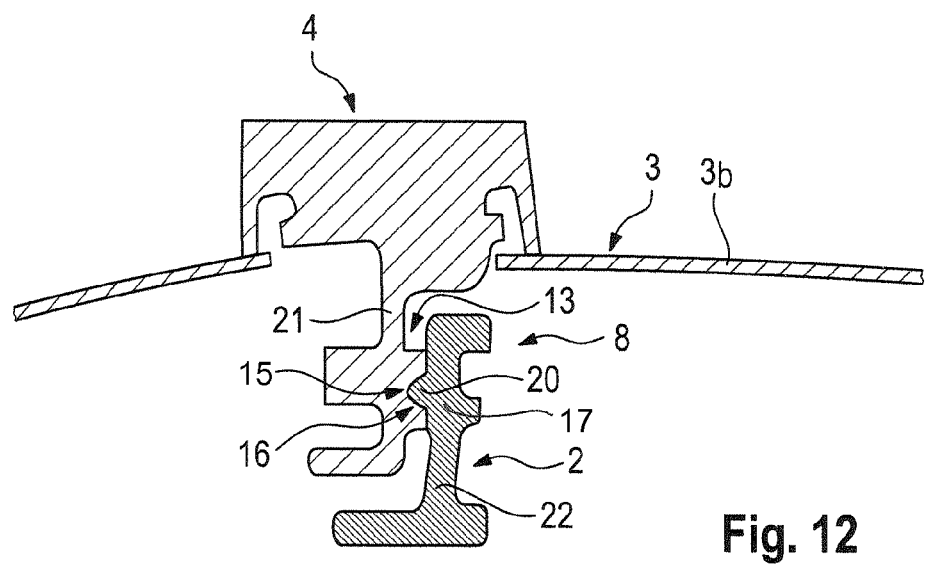
FIG. 12 shows a section according to the line XII-XII of FIG. 8.

An exterior mirror 1 is mounted on a vehicle door 3 or on a door outer skin 3b via a mirror foot upper part 4 and is connected separably to a mirror foot lower part 2 on which a mirror head 5 with a mirror surface 6 is held.

The exterior mirror 1 legally is required to detach from the vehicle in the event of a "pendulum impact". To meet this requirement, the mirror foot lower part 2 and the mirror foot upper part 4 are held together via a multi-point mounting 7, 8, 9 and are pressed together by a leaf spring 10 that is fastened to the mirror foot upper part 4. For this purpose, the leaf spring 10 engages from above over a wall section 11 of the mirror foot lower part 2. The mountings 7, 8 and 9 between the mirror foot lower part 2 and the mirror foot upper part 4 form a longitudinally running connecting plane, that also defines a separating plane 12 along which the mirror foot parts 2 and 4 are separated from each in arrow direction P in the event of an impact. The separating plane 12 is arranged non-visibly within the door 3 in the door cavity 3a, and no joints are visible on that section of the mirror foot upper part 4 from the outside, which is advantageous for optical reasons. The mirror foot lower part 2 is connected to an element 3c of the door 3 and remains in the cavity 3a of the door 3 after the mirror foot parts 2 and 4 are separated from each other.

The multi-point mounting 7, 8, 9 on the mirror foot upper part 4 has local bearing points 13, 14 and 15 each having a wedge-shaped depression 16. Local bearing points 17, 18, 19 on the mirror foot lower part 2 have corresponding wedge-shaped projections 20 and engage the wedge-shaped depression 16 at the connecting position I.

In particular, the bearing points 13, 14 and 15 of the common bearings 7, 8 and 9 with the wedge-shaped depression 16 are arranged on a bearing plate 21 of the mirror foot upper part 4 and the correspondingly arranged bearing points 17, 18, 19 with the wedge-shaped projections 20 are arranged on a holding plate 22 of the mirror foot lower part 2. The bearing points are arranged at tips of an imaginary triangle.

The two upper bearing points 13, 15 of the bearing 7 on the mirror foot upper part 4 are spaced apart from one another in a common plane x-x and the two upper bearing points 17, 18 of the bearing 8 on the mirror foot lower part 2 are spaced apart from one another in a common plane x-x. The upper bearing points 13, 15 and 17, 18 are oriented obliquely with respect to one another. The further bearing points 14 and 19 are located therebelow and are oriented upright in a vertical plane y-y.

The bearing points 17, 18 on the holding plate 22 of the mirror foot lower part 2 are bordered laterally in each case by offset limbs 24, 25 of the holding plate 22. The limbs 24, 25 laterally support the bearing plate 21 of the mirror foot upper part 4 in the connecting position I of the mirror foot parts 2 and 4.

The leaf spring 10 on the mirror foot upper part 4 is arranged between the two upper bearing points 13 and 15 of the bearings 7 and 8 and is connected to the holding plate 22 via two screw bolts 26. A free lower end 27 of the leaf spring 10 extends toward the lower bearing point 14 and engages over a prepared wall section 11 of the bearing plate 21 of the mirror foot lower part 2 in a clamping manner.

The free end 27 of the leaf spring 10 is arranged and held in a pocket-shaped receptacle 30. The wall section 11 of the holding plate 22 lies directly in the center of the three bearing points 17, 18 and 19 of the holding plate of the mirror foot lower part 2.

The mirror foot upper part 4 is connected to the mirror foot lower part 2 via the mountings 7, 8, 9 within the cavity of the door 3, and therefore the separating plane 12 is not visible from the outside and that part of the mirror foot upper part 4 which protrudes out of the door 3 via the door panel 3b is joint-free.

What is claimed is:

1. An exterior mirror for a motor vehicle, the motor vehicle having a vehicle door with a cavity inside the vehicle door, the exterior mirror comprising a mirror foot lower part disposed in the cavity inside the vehicle door and fastened to a support in the cavity of the vehicle door; a mirror foot upper part having an outer section external of the vehicle door and an inner section in the cavity, a mirror head attached to the outer section of the mirror foot upper part, the inner section of the mirror foot upper part being held on the mirror foot lower part via a multi-point mounting that comprises three bearings on the inner section of the mirror foot upper part engaged respectively with three mating bearings on the mirror foot lower part, the bearings and the mating bearings being held pressed together by a leaf spring that is fastened to the inner section of the mirror foot upper part, so that, in a connecting position, the leaf spring engages over a wall section of the mirror foot lower part, and a separating plane being defined by the mountings between the mirror foot lower part and the mirror foot upper part so that the mirror foot upper part and the mirror head are separable along the separating plane from the mirror foot lower part that is fastened in the cavity of the vehicle door.

2. The exterior mirror of claim 1, wherein the bearings and the mating bearings comprises mating pairs of wedge-shaped depressions and wedge-shaped projections, the wedge-shaped projection and the wedge-shaped depression in each of the pairs being engaged with one another in a connecting position.

3. The exterior mirror of claim 2, wherein the wedge-shaped depressions are arranged in a triangular array on a bearing plate of the mirror foot upper part, and the wedge-shaped projections are arranged in a corresponding triangular array on a holding plate of the mirror foot lower part.

4. The exterior mirror of claim 3, wherein the mating pairs of bearings comprise two upper pairs of bearings that are spaced apart from one another in a common plane and are arranged in a manner converging obliquely, and a pair of lower bearings that are arranged below the upper pairs of bearing and that are oriented upright in a vertical plane.

5. The exterior mirror of claim 4, wherein the bearing of the mirror foot lower part are bordered laterally by offset limbs of the holding plate, and, in the connecting position with the mirror foot upper part on the bearing plate, the limbs are arranged in a laterally supporting manner.

6. The exterior mirror of claim 4, wherein the leaf spring on the mirror foot upper part is arranged between the two upper pairs of bearing points and is connected to the bearing plate via screw bolts, the leaf spring having a free leaf spring end extending toward the lower bearing point and engaging over the wall section of the holding plate of the mirror foot lower part in a clamping manner.

7. The exterior mirror of claim 6, wherein the wall section has a pocket-shaped receptacle and the free end of the leaf spring is inserted and held in the pocket-shaped receptacle.

8. The exterior mirror of claim 3, wherein the wall section of the holding plate of the mirror foot lower part is centrally disposed with respect to the three bearing points.

9. The exterior mirror of claim 1, wherein the separating plane is in the cavity of the door.

10. The exterior mirror of claim 1, wherein the leaf spring is aligned substantially normal to an outer skin of the vehicle door.

11. The exterior mirror of claim 1, wherein the separating plane is aligned substantially normal to an outer skin of the vehicle door.

* * * * *